United States Patent [19]

Gaither et al.

[11] Patent Number: 4,982,496
[45] Date of Patent: Jan. 8, 1991

[54] METHOD OF MAKING LUG JOURNAL FOR ROLLER CUTTER DRILL BITS

[75] Inventors: Paul I. Gaither, Houston; Steve W. Klappenbach, Katy, both of Tex.

[73] Assignee: Camco International Inc.

[21] Appl. No.: 437,180

[22] Filed: Nov. 16, 1989

[51] Int. Cl.$^5$ .......................... B21D 53/10; B23B 3/22
[52] U.S. Cl. ............................... 29/898.042; 76/108.2; 82/1.11; 82/131; 408/1 R
[58] Field of Search .................... 29/149.5 R, 898.042; 408/1 R; 82/1.11, 131; 76/108.2

[56] References Cited

U.S. PATENT DOCUMENTS 4,599,921  7/1986  Gaither et al. ...................... 82/1.11
4,626,149  12/1986 Holy et al. .......................... 82/131 X
4,660,444  4/1987  Sorensen et al. ............. 76/DIG. 2 X Primary Examiner—Steven C. Bishop
Attorney, Agent, or Firm—Dodge Bush & Moseley

[57] ABSTRACT

A method of machining a journal (14) on a lug (10) for a roller cutter drill bit in which the stand (22) holding the lug (10) is fixed and a cutting tool (26) is mounted on a holder (24) over the journal (14) for rotating about the journal (14). Two separate machining procedures for the journal (14) are provided with each machining procedure employing a separate cutting tool (24). A rough truing cut is made with a first cutting tool (24) and a final finish cut is made with a sharp second cutting tool (24) having cutting surfaces unused except on the finish surfaces.

9 Claims, 1 Drawing Sheet

METHOD OF MAKING LUG JOURNAL FOR ROLLER CUTTER DRILL BITS

BACKGROUND OF THE INVENTION

This invention relates to a method of making a lug journal for a roller cutter drill bit, and more particularly to the method of finish machining such a lug journal by a cutting tool while the lug journal is mounted within a workpiece holding fixture on a stationary stand.

A rotary drill bit is normally formed of three generally identical elongated body sections or lugs which are welded together to form the completed drill bit. Each lug provides 120° of the completed drill bit body. Heretofore, it has been common to mount the lug or workpiece within a workpiece holding fixture on a rotary fixture of a lathe and to rotate the fixture relative to a cutting tool positioned in a fixed holder outwardly of the fixture. The lug must be accurately positioned on the lathe in order for the lug journal to be machined properly and precisely. Also, in order to provide a balancing of the lathe with the workpiece mounted thereon, a suitable counterbalance has been mounted on the fixture in an opposed relation to the workpiece to provide balancing of the rotating fixture. Oftentimes, the counterbalance is not of the identical weight or configuration as the workpiece, and it is difficult also during setup to align the centerline of the semifinished lug journal with that of the cutting centerline of the rotating fixture closer than around 0.010 inch. These counterbalancing difficulties are usually not critical except in relatively large diameter drill bits over around twelve inches in diameter, for example. Thus, as a result of imbalance it is difficult to finish machine case hardened lug journals for a rock bit having a diameter over twelve (12) inches on a lathe rotating a fixture holding the lug. It has heretofore been necessary to finish grind these lug journals for large bits in order to achieve the desired dimension tolerances and surface finishes. Dimension tolerances less than about 0.005 inch and surface finishes less than 35 RMS must be maintained which results in a costly operation.

SUMMARY OF INVENTION

The present invention is particularly directed to an improved method of finish machining a case hardened lug journal for a large diameter roller cutter drill bit in which the workpiece holding fixture for the lug journal is maintained in a fixed position and does not rotate. Instead, the cutting tool mounted outwardly of the fixed workpiece is rotated. Since the lug journal is not rotated, any possible problem or difficulty from counterbalancing is significantly reduced because only the rotating cutting tool and holder need be balanced. This method while adapted for use with all sizes and configuration of lugs, is particularly useful for finish machining case hardened lug journals for drill bits over around twelve (12) inches in diameter as such case hardened journals are especially difficult to finish machine on lathes with the journal rotating instead of the cutting tool.

The method includes two separate machining procedures. A first machining procedure is a so-called rough cutting procedure or truing cut on the bearing and sealing surfaces of the journal in which between 0.004 inch and 0.012 inch stock is left on the journal surface. The second machining procedure is a final finishing cut with a separate sharp cutting tool used only for finishing cuts, and preferably the cutting surface is formed of CBN (cubic boron nitride) material. The finishing cut with the separate sharp tool provides a finish having a roughness less than around 35 RMS and as low as around 10 RMS but normally between 16 RMS and 32 RMS. A diametrical dimensional tolerance of less than 0.004 inch is provided in the final finishing cut.

It is an object of this invention to provide an improved method for finish machining a case hardened lug journal for a large diameter rotary drill bit utilizing a fixed stand on which the lug journal is mounted.

It is an additional object to provide a method for finish machining a case hardened lug journal of a large diameter rotary drill bit which is less costly than grinding.

It is a further object of this invention to provide such an improved method for a lug journal which includes two separate cutting procedures utilizing separate cutting tools which rotate or revolve about a fixed lug journal for precise finish machining of the journal to predetermined dimensions and finish.

Other objects, features and advantages of this invention will become more apparent after referring to the following specification and drawings.

DESCRIPTION OF THE INVENTION

Figure 1:
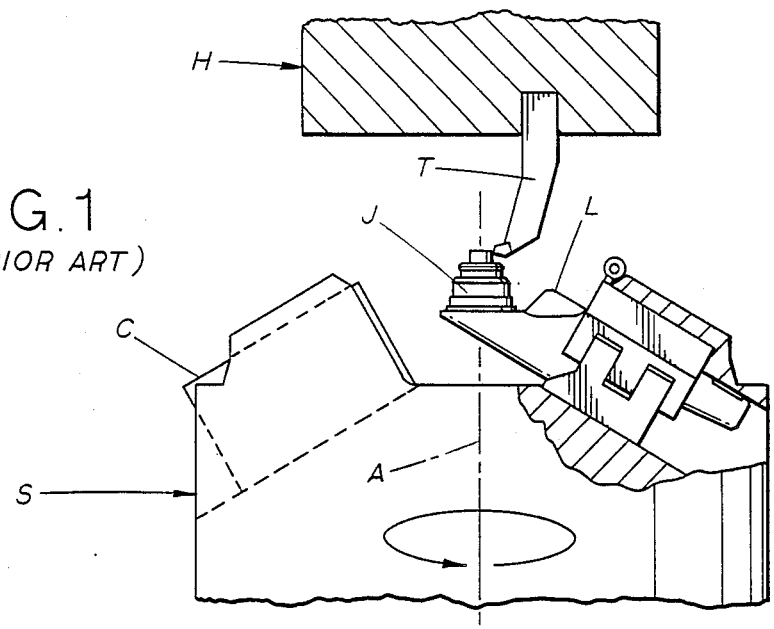
FIG. 1 is a diagrammatical view of an example of a prior art machining operation for a lug journal in which a lug is mounted on a rotary fixture in the lathe which revolves about a stationary overhead cutting tool during the cutting operation.

Referring to FIG. 1, a prior art apparatus for machining a lug journal is illustrated in which a rotary fixture S is mounted for rotation about a vertical axis A passing through the longitudinal axis or centerline of a journal J on a lug L. A stationary cutting tool T is mounted on a fixed holder H above lug L. Cutting tool T has a cutting surface for engaging journal J as journal J rotates with fixture S about axis A. A counterbalance C is provided on fixture S in opposed relation to lug L so that fixture S is balanced upon rotation. It is difficult to obtain a precise counterbalance for various sizes and shapes of lugs L and imbalancing tends to provide imprecise grinding or machining particularly with journals J such as for large diameter rock bits over twelve (12) inches in diameter. Also, it is difficult to align the centerline of journal J closer than about 0.010 to the centerline about which fixture S rotates. This adds to the imbalance problem.

Figure 2:
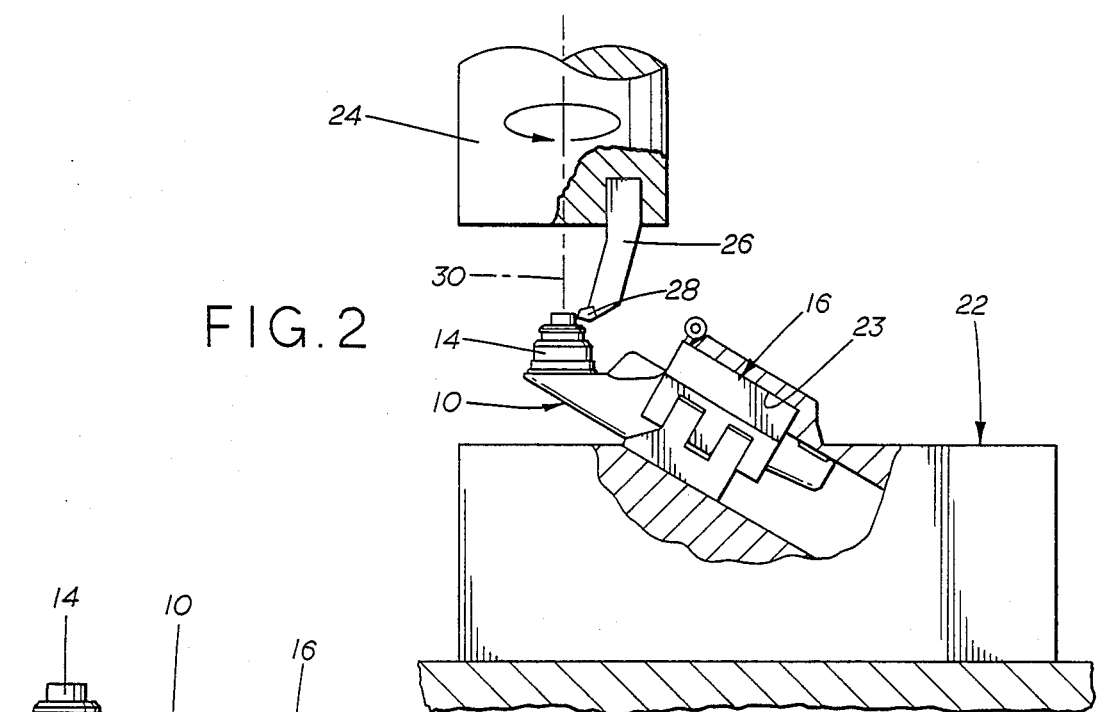
FIG. 2 is a diagrammatic view of the present invention in which the lug is supported within a workpiece holding fixture on a stationary stand of a lathe and a cutting tool rotates about the fixed lug journal during the cutting operation.
Figure 3:
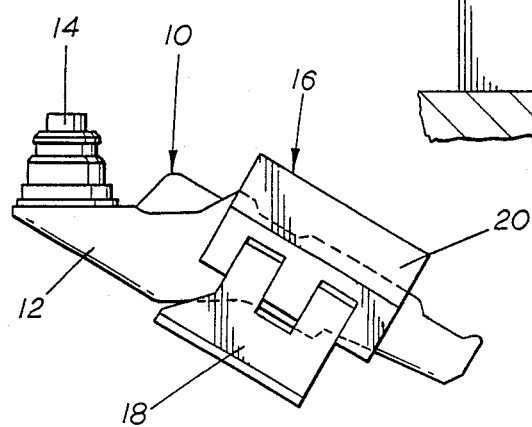
FIG. 3 is a side elevation of the lug journal mounted within a holder for insertion and securement within locating surfaces on the stand of FIG. 2.

Referring to FIGS. 2 and 3 in which an apparatus is shown diagrammatically for carrying out the method comprising this invention, a body section or lug is shown generally at 10 from which a rotary drill bit is formed. Normally, three generally identical elongated sections or lugs 10 are welded together to form the completed drill bit. Lug 10 has a leg or shank 12 with a bearing journal 14 on one end thereof for receiving a roller cutter thereon after the final machining operation. For positioning lug 10 in a stationary position within a lathe for machining journal 14, a holder generally indicated 16 and including a pair of interfitting body portions 18, 20 is fitted about lug 10 and secured together against the adjacent surfaces of lug 10 for tightly holding lug 10 therebetween. Holder 16 is adapted to be utilized with several shapes and sizes of lugs 10. After mounting within holder 16, lug 10 is then ready for securement within a static or fixed stand 22. Stand 22 has a pocket forming a workpiece holding fixture 23 to receive holder 16 and hydraulic clamping means removably secure holder 16 and lug 10 within workpiece holding fixture 23 on stand 22 with a vertical longitudinal axis 30 extending through the longitudinal axis of journal 14. Journal 14 projects above static stand 22 and is thereby exposed for the cutting operation. For further details of holder 16, reference is made to U.S. Pat. No. 4,599,921 dated July 15, 1986, the entire disclosure of which is incorporated by this reference.

A holder or fixture 24 for a cutting tool 26 is shown in FIG. 2 mounted for rotation about axis 30. Cutting tool 26 has a cutting insert 28 at its lower end mounted for rotation with holder 24 about longitudinal axis 30 with cutting insert 28 revolving about fixed journal 14 for machining and finishing journal 14. Cutting tool 26 may be provided with various cutting inserts of different shapes, sizes and materials, as desired. CBN cutting inserts may form the cutting surfaces on tool 26 for obtaining precise dimensioning and precise finishes for any final finish cuts on the case hardened surface of journal 14. For example, an insert which has been found to be satisfactory is a sintered tungsten carbide insert having a CBN material cutting surface brazed thereon with a high temperature brazing material and an edge preparation sharp with a 0.001–0.003 honed edge. A commercially available insert is designated as ANSI (American National Standard Institute) TNMC-64NG-3FA-CBN and manufactured by the GTE Valenite Corporation, Troy, Michigan. Ceramic cutting tools may be used but in finish machining case hardened steel having a hardness around 60 Rockwell C typical of bit journals, the wear and chipping of such cutting tools may be substantial which would make the ceramic tools uneconomical.

For preparation of the journal prior to application of the method comprising the present invention, a journal on a lug blank made of forged steel is first rough machined. Then the journal is selectively case hardened by placing the journal in a can or pot filled with a suitable carburizing compound. Next, the journal and can are placed in a furnace heated to 1700F. for 20 hours, and then slow cooled to room temperature. The can and carburizing compound are removed from the furnace and the journal is reheated to 1550F. for one hour followed by quenching in oil at 250F. for cooling thereafter to room temperature.

The above treatment of the journal provides a case depth about 1/16 inch in thickness and a case hardness about 60 RC at surfaces with a core hardness about 25 RC. Two locating or flat surfaces are then formed on the shank of the journal at 120 degrees with respect to one another for the accurate positioning of the journal on the fixed stand 22. These locating surfaces help locate the centerline of the journal 14 and the rotational axis of the rotating cutter holder 24 to within about 0.010 inch with respect to one another. In this condition journal 14 is now ready for the application of the improved method of this invention.

For the application of the method comprising this invention to journal 14, lug 10 is first clamped within holder 16 or other suitable mounting fixture and then secured onto fixed or static stand 22 with journal 14 having its longitudinal axis along vertical axis 30. Then, with a CBN cutting tool 26 mounted within holder 24 for rotation about journal 14, a truing cut is made on all bearing and sealing surfaces of journal 14 making journal 14 round within 0.003 TIR (total instrument reading) while leaving between 0.004 to 0.012 inch of stock material on such bearing and sealing surfaces beyond final dimensions for a final finishing cut by another separate cutting tool with sharp cutting surfaces thereon.

It is important to remove at least about 0.004 inch of stock in this finishing cut to insure a clean cut surface and avoid so called push off which could make it difficult to maintain the desired dimensions and surface finish. It is also important not to remove more than about 0.012 inches of stock because the resulting heavy cutting force could cause tool chipping, or deflection resulting in ovality and taper.

The first cutting tool 26 is removed from holder 24 and a second cutting tool 26 is mounted on holder 24 for finish machining the lug. The second cutting tool 26 has cutting surfaces thereon preferably formed of a CBN material for providing a hard sharp cutting edge which has not been previously used except in finishing operations. Thus, a fresh sharp and hard cutting edge is provided by the second cutting tool for the final finish cut. The final finish cut is made on the excess stock material of 0.004 inch to 0.012 inch left on the bearing surfaces by the first cutting tool and a tolerance no greater than 0.003 inch is provided by the second cutting tool. The out of roundness of the finished bearing surface is within 0.0005 inch T.I.R. and a roughness of around 30 RMS will be provided. It is believed a roughness between 10 RMS and 35 RMS will be maintained under the various conditions of use of the present invention.

The machining method according to the present invention is more economical for finish machining case hardened lugs for large diameter rock bits over twelve inches in diameter than grinding as heretofore employed in which a rotating grinding wheel is mounted on a spindle with the lug journal rotating and performing a plunge grinding operation as less setup time and less cycle time are involved with the method of the present invention. Further, the method of this invention provides a method for finish machining of the journal to predetermined dimensions and finish without any subsequent grinding being required.

While a preferred embodiment of the method comprising the present invention has been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

We claim:

1. A method of finish machining a case hardened lug journal for a roller cutter drill bit comprising the following steps:

rough machining a journal on the extending end of a lug;

case hardening the rough machined journal on the lug;

placing the lug having the case hardened journal on the extending end thereof on a fixed stand with the journal having a central longitudinal axis;

mounting a holder for a cutting tool adjacent the journal for rotation of the holder about the central longitudinal axis of the journal;

removably mounting a first cutting tool on the holder for rotation with the holder about the journal;

rotating said first cutting tool about said journal to take a rough truing cut on the bearing surface of said journal and leaving between around 0.004 inch and 0.012 inch of stock material on the journal surface in excess of final dimensioning;

providing a sharp second cutting tool on the holder; and rotating said second cutting tool about said journal in a final finish cut on said bearing surface of said journal for final dimensioning and providing a final finish having a roughness less than around 35 RMS.

2. The method as set forth in claim 1 wherein the step of rotating said second cutting tool about said journal in the final finish cut is at a tolerance of less than 0.005 inch.

3. The method as set forth in claim 1 wherein the mounting of said second cutting tool includes a second cutting tool having CBN (Cubic Boron Nitride) cutting elements thereon for making the final finish cut.

4. The method as set forth in claim 1 wherein the machining of the lug journal is performed on a large diameter journal for a drill bit over twelve (12) inches in diameter.

5. The method as set forth in claim 1 wherein the step of rotating said second cutting tool in the final finish cut provides a finish cut between 0.004 inch and 0.012 inch.

6. The method as set forth in claim 1 including the steps of:

removing said first cutting tool from said holder; and then removably mounting the second cutting tool on said holder for replacing said first cutting tool.

7. A method of finish machining a case hardened lug journal for a roller cutter drill bit comprising the following steps:

providing a fixed stand;

providing a lug with a case hardened journal on an extending end thereof;

placing the lug having the case hardened journal on the extending end thereof on said fixed stand with the journal having a longitudinal axis and projecting outwardly from said stand;

mounting a holder for a cutting tool outwardly from the fixed stand and adjacent the journal for rotation of the holder about the longitudinal axis of the journal while the journal is held in a fixed position;

removably mounting a first cutting tool on the holder for rotation with the holder about the journal;

rotating said first cutting tool about said journal to take a rough truing cut on the bearing surface of said journal and leaving between 0.004 inch and 0.012 inch of stock material on the journal surface in excess of final dimensioning;

removing said first cutting tool from said holder;

removably mounting a second cutting tool on said holder after removal of said first cutting tool with said second cutting tool having a sharp cutting surface thereon formed of a cubic boron nitride material; and rotating said second cutting tool about the longitudinal axis of said journal in a final finish cut on said bearing surface of said journal between 0.004 inch and 0.012 inch and providing a final finish having a roughness less than around 35 RMS. final finish having a roughness less than around 35 RMS.

8. The method as set forth in claim 7 wherein the step of rotating said second cutting tool about the longitudinal axis of said journal in the final finish cut includes a journal for a drill bit over twelve (12) inches in diameter with the final finish cut being at a diametrical tolerance not greater than around 0.003 inch.

9. The method as set forth in claim 8 including prior to placing the lug journal on the stand the following steps:

forming the lug journal of forged steel;

rough machining the lug journal thus formed;

heat treating the lug journal to form the bearing surface of the journal; and case hardening the journal surface to a hardness of around RC60.

* * * * *